United States Patent
Kommanaboyina

(10) Patent No.: US 9,436,637 B2
(45) Date of Patent: Sep. 6, 2016

(54) NETWORK-ON-CHIP ARCHITECTURE FOR MULTI-PROCESSOR SOC DESIGNS

(71) Applicant: Advanced Micro Devices, Inc., Sunnyvale, CA (US)

(72) Inventor: Sudarshanam Kommanaboyina, Andhra Pradesh (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 447 days.

(21) Appl. No.: 13/897,049

(22) Filed: May 17, 2013

(65) Prior Publication Data

US 2014/0344501 A1 Nov. 20, 2014

(51) Int. Cl.
*G06F 13/40* (2006.01)
*G06F 15/173* (2006.01)

(52) U.S. Cl.
CPC ..... *G06F 13/4022* (2013.01); *G06F 15/17368* (2013.01)

(58) Field of Classification Search
CPC . G06F 15/80; G06F 15/173; G06F 15/17368
See application file for complete search history.

(56) References Cited

U.S. PATENT DOCUMENTS

| | | | | |
|---|---|---|---|---|
| 5,257,266 A | * | 10/1993 | Maki | 714/4.1 |
| 5,859,983 A | * | 1/1999 | Heller et al. | 709/251 |
| 2005/0021699 A1 | * | 1/2005 | Kota et al. | 709/221 |
| 2013/0067197 A1 | * | 3/2013 | Liu et al. | 712/29 |

\* cited by examiner

*Primary Examiner* — Tim T Vo
*Assistant Examiner* — Phong H Dang
(74) *Attorney, Agent, or Firm* — Volpe and Koenig, P.C.

(57) ABSTRACT

A system and method embodying some aspects for communicating between nodes in a network-on-chip are provided. The system comprises a microprocessing chip and a plurality of connection paths. The microprocessing chip comprises sixteen processing nodes disposed on the chip. The plurality of connection paths are configured such that each is at most three hops away from any other node. Each node also has connection paths to at most three other nodes.

16 Claims, 4 Drawing Sheets

NETWORK-ON-CHIP ARCHITECTURE FOR MULTI-PROCESSOR SOC DESIGNS

BACKGROUND

1. Field

The embodiments are generally directed to Network-on-Chip architecture designs. More particularly, the embodiments are directed to efficient communication between nodes in a Network-on-Chip architecture.

2. Background Art

As technology scales down, an increasing number of designs are getting integrated on the same silicon die, causing demand for on-chip communication architecture. Many system-on-a-chip (SoC) designs use commercially available bus-based topologies, such as VME, AMBA, and CoreConnect, for on-chip communication because of their simple architectures and low area costs. Bus-based topologies clearly cannot satisfy the very demanding needs of today's on-chip communication because of the lack of scalability; only one component pair can communicate at a time, and the load capacitance of the entire bus has to be driven during each data transfer.

Switch-based network design was proposed as an alternative to bus-based topologies. A switching network provides high-performance on-chip communication for SoC designs. There are different on-chip communication architectures based on the switch-based design.

There is a need for an easily sealable communication architecture between nodes that both provides high performance and reduces the node complexity.

BRIEF SUMMARY OF EMBODIMENTS

A system and method embodying some embodiments for communicating between nodes in a network-on-chip are provided. The system comprises a microprocessing chip and a plurality of connection paths. The microprocessing chip comprises sixteen processing nodes disposed on the chip. The plurality of connection paths are configured such that each is at most three hops away from any other node. Each node also has connection paths to at most three other nodes.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate some embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

Figure 3A:
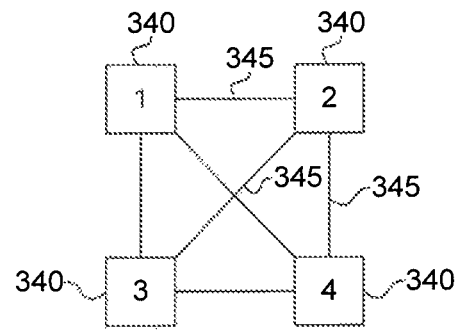
Figure 3B:
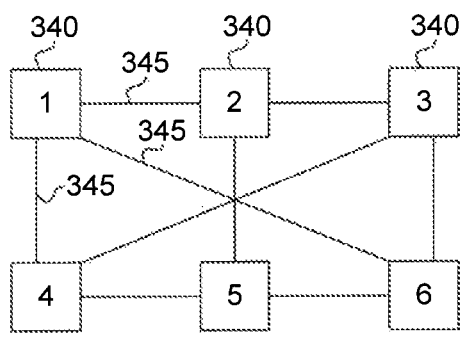
Figure 3C:
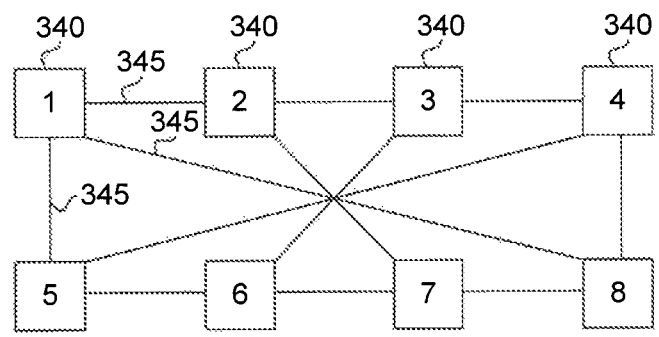

FIGS. 3a, 3b, and 3c are illustrations of embodiments of communication architectures with 64, 96, and 128 nodes, according to embodiments.

Figure 4:
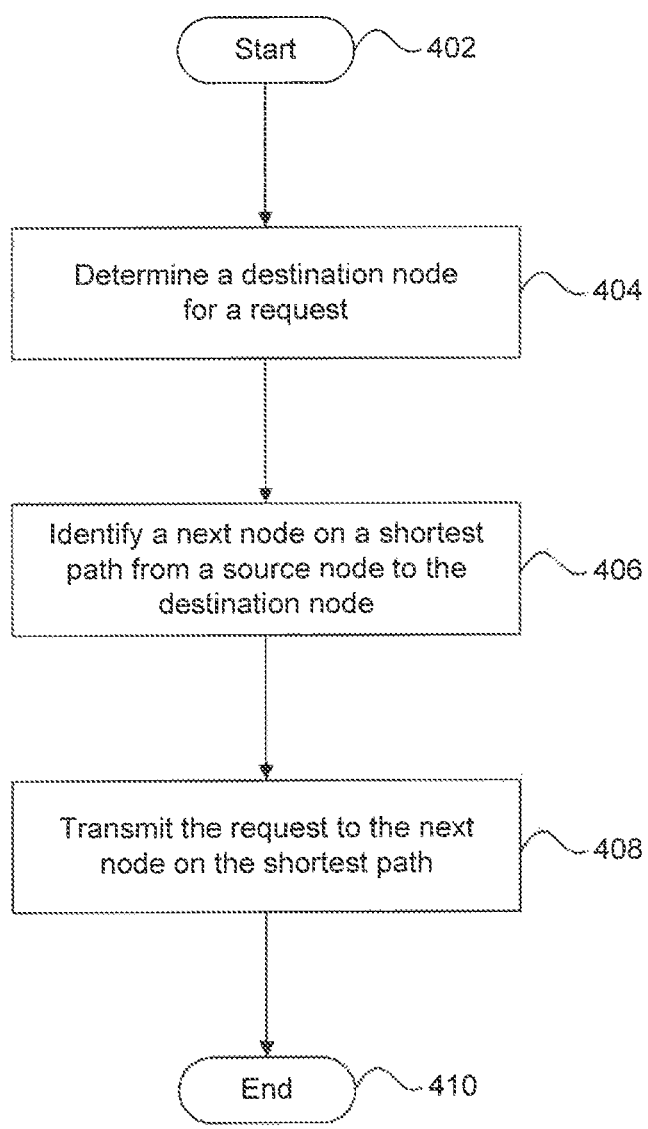

FIG. 4 is an illustration of an embodiment of a method of communicating between nodes, according to an embodiment.

DETAILED DESCRIPTION OF EMBODIMENTS

The following detailed description refers to the accompanying drawings that illustrate exemplary embodiments. Other embodiments are possible, and modifications can be made to the embodiments within the spirit and scope of the disclosed embodiments. Therefore, the detailed description is not meant to limit the scope of the embodiments. Rather, the scope of the claimed subject matter is defined by the appended claims.

It would be apparent to a person skilled in the relevant art that the embodiments, as described below, can be implemented in many different embodiments of software, hardware, firmware, and/or the entities illustrated in the figures. Thus, the operational behavior of embodiments will be described with the understanding that modifications and variations of the embodiments are possible, given the level of detail presented herein.

This specification discloses one or more systems that incorporate the features of the embodiments. The disclosed systems merely exemplify the embodiments. The scope of the embodiments is not limited to the disclosed systems. The embodiments are defined by the claims appended hereto.

The systems described, and references in the specification to "one system", "a system", "an example system", etc., indicate that the systems described may include a particular feature, structure, or characteristic, but every embodiment may not necessarily include the particular feature, structure, or characteristic. Moreover, such phrases are not necessarily referring to the same system. Further, when a particular feature, structure, or characteristic is described in connection with a system, it is understood that it is within the knowledge of one skilled in the art to affect such feature, structure, or characteristic in connection with other embodiments whether or not explicitly described.

For Network-on-Chip systems, the choice of on-chip communication architecture plays an important role in the SoC performance and system-level power management. Multi-processor SoC (MPSoC) designs need an on-chip communication architecture that provides high performance, less complex nodes and easily scalable architectures. There are two types of MPSoC networks: direct network and indirect network.

In direct network, routing and arbitration functions are inside the node processor. SoC design methodology should use the on-chip communication architecture to reduce design costs and shorten time-to-market.

Figure 1:
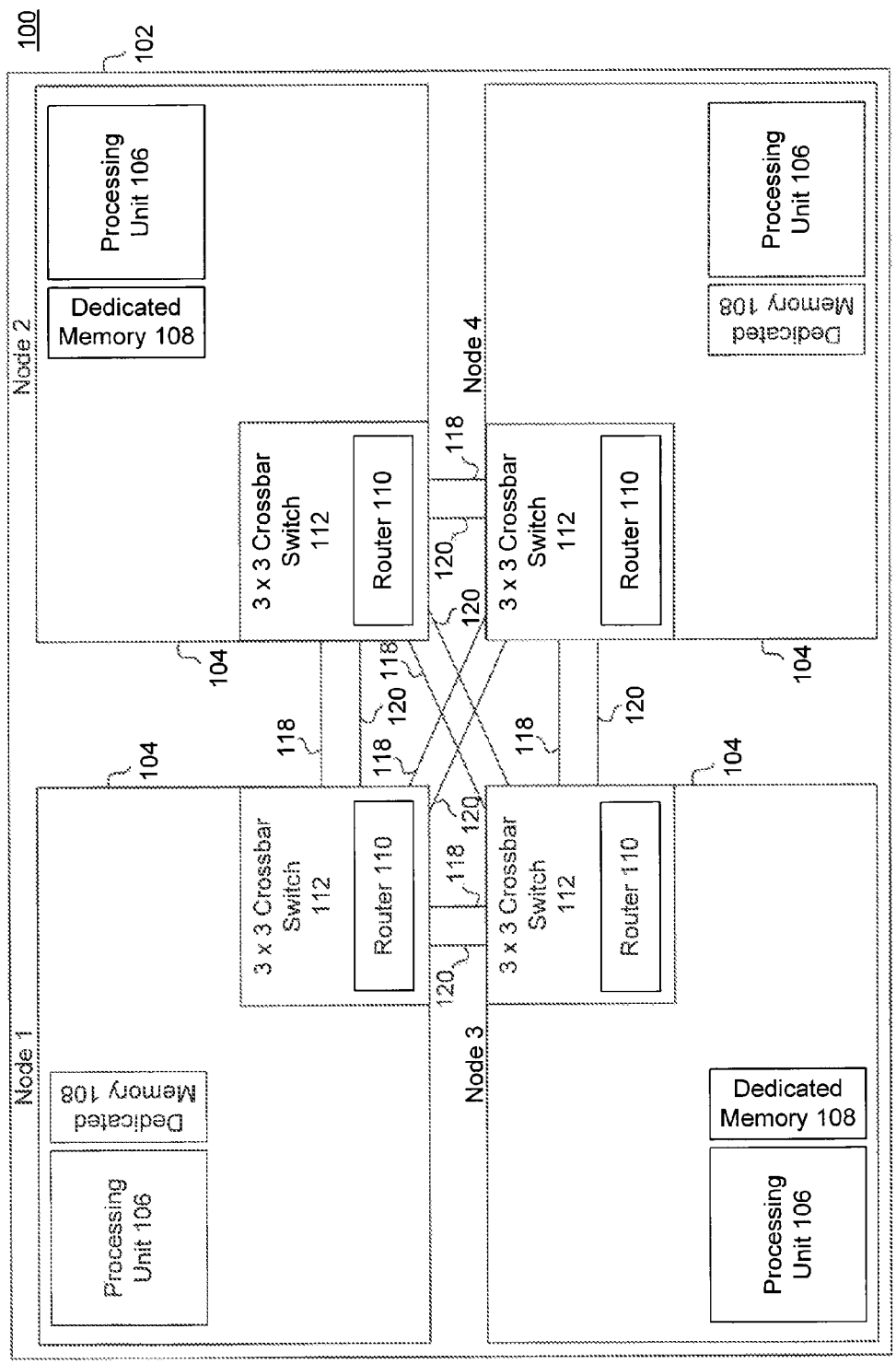
FIG. 1 is an illustration of an exemplary network-on-chip architecture, in accordance with an embodiment.

FIG. 1 shows a network communication system 100 in which embodiments described herein can be implemented. In an embodiment, network communication system 100 includes four nodes 104a-d, each coupled to the other three nodes via wires $118_{0-5}$ and $120_{0-5}$. Each node, i.e., nodes 104a-d, includes a processing unit, i.e., processing units 106a-d, a dedicated memory, i.e., dedicated memories 108a-d, and a 3×3 crossbar switch, i.e., 3×3 crossbar switches 112a-d.

Processing units 106a-d performs tasks on data. Processing units 106a-d can be, for example and without limitation, a central processing unit (CPU), graphics processing unit (GPU), advanced processing unit (APU), field programmable gate array (FPGA), application specific integrated circuit (ASIC), or similar processing units.

Processing units 106*a-d* first search their dedicated memory 108, dedicated memory 108*a-d* respectfully, for the data required to perform a given task before reaching out to another processing unit for the data. For example, if processing unit 106*a* requires current location data to perform location based service tasks, processing unit 106*a* first searches dedicated memory 108*a* for the current location data. If dedicated memory 108*a* does not have the current location data, processing unit 106*a* may request that processing unit 106*d* search dedicated memory 108*d* for the current location data. Dedicated memory 108*a-d* can be, for example and without limitation, Dynamic Random Access Memory (DRAM), Flash memory, Static Random Access Memory (SRAM), or similar memory units.

3×3 crossbar switches 112*a-d* route the requests in the appropriate direction, 3×3 crossbar switches 112*a-d* receive requests for data from the respective processing unit 106*a-d* along with the identify of a destination node that has that data. 3×3 crossbar switches 112*a-d* can also receive requests from another node and the identity of a destination node. Routers 110*a-d* determine which direction to send either request. In an embodiment, Routers 110*a-d* are programmed with a mapping of the nodes in the network as well how they are connected. In another embodiment, Routers 110*a-d* dynamically determine the mapping using known methods. Routers 110*a-d*, knowing the layout of the nodes on the chip, determine which node, connected to this node, is the closest to the destination node. 3×3 crossbar switches 112*a-d* then route the request to the appropriate node.

In order to clearly illustrate the nodes and connection, FIG. 1 illustrates a network communication system 100 comprised of only four nodes. A person skilled in the art would understand that a network communication system 100 could comprise more or less nodes, depending on the needs of the system. In addition, a person skilled in the art would understand that each node in the system can be connected to one, multiple, or all of the other nodes in the system, depending on design considerations.

Figure 2:
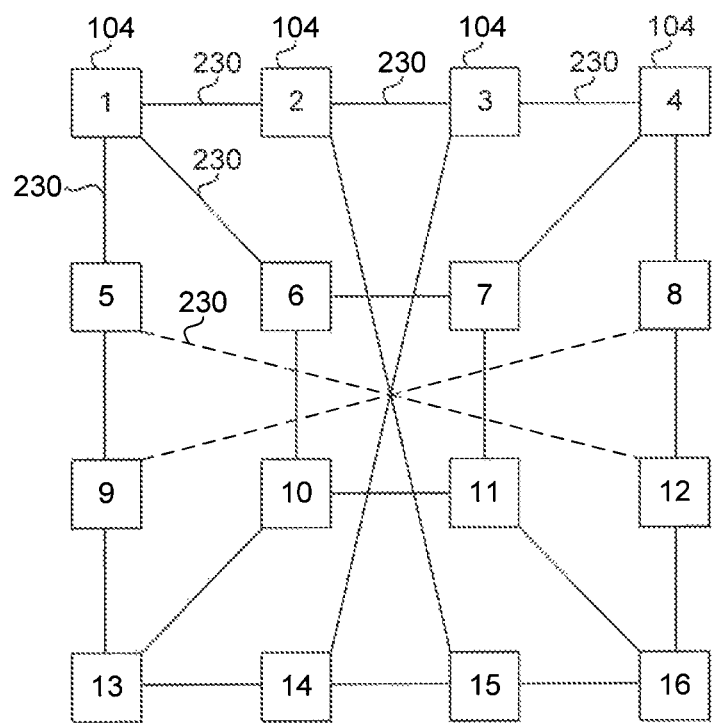
FIG. 2 is an illustration of a communication architecture for sixteen nodes, according to an embodiment.

FIG. 2 shows an embodiment of a 16-node network communication system 200, in which embodiments described herein can be implemented. The 16-node network communication system 200 includes 16 nodes 104. In an embodiment, each node 104 is directly connected to at most three other nodes 104 via connection paths 230. For example, in FIG. 2 each node 104 is directly connected to exactly three other nodes. Thus, as shown in FIG. 2, the embodiment has 24 connection paths 230. This arrangement allows for reduced complexity by minimizing the number of connection paths 230 within the 16-node network communication system 200, while guaranteeing that no node is more than three hops from any other node.

In an embodiment, each connection path 230 consists of two wires, for example wires 118 and 120 described above and illustrated in FIG. 1. The wires are an input wire and output wire for each node.

In an embodiment, each node 104 is connected to three other nodes 104. In addition, each node is within three hops of each of the other 15 nodes in 16-node network communication system 200. For example, node "1" is three hops from node "11," i.e., a request can travel from node "1" to node "6" (hop 1), then to node "10 (hop 2), and then to node "11" (hop 3).

In an embodiment, a node receives a request and a destination node for the request. The node then determines the next node in the path from a source node to the destination node. To accomplish this, in an embodiment, each node may contain a mapping associating each of the other 15 nodes in the network with one of its neighbor nodes that a request destined for that node is supposed to go to. In an embodiment, this mapping is stored in routers 110*a-d*, illustrated in FIG. 1. In another embodiment, this mapping is stored in dedicated memories 108*a-d*. For example, node "1" can associate node "6" with destination node "11" and node "6" can associate and "10" with destination node "11."

In another embodiment, a source node determines the path for the request to travel to a destination node. The source node then transmits the path along with the request to the next node. For example, node "1" determines that the request will travel to nodes "6" and "10" before arriving at node "11." Node "1" then transmits that information along with the request to node "6" which than transmits that information along with the request to node "10."

FIGS. 3*a*, 3*b*, and 3*c* show systems including multiple 16-node groupings, in which embodiments described herein can be implemented. The 16-node groupings include more than one 16-node networks 340, for example 16-node network communication system 200. Each of these 16-node networks is connected to one or more other 16-node networks via network connection paths 345. FIGS. 3*a*, 3*b*, and 3*c* are provided for exemplary purposes only, and not for limitation. A skilled designer would understand that while 64, 96, and 128 node networks are illustrated, networks of other sizes are possible. A skilled designer would also understand that while one configuration of 64, 96, and 128 node networks has been illustrated, other configurations are also possible and are contemplated within the scope of this disclosure.

In an embodiment, network connection paths 345 consists of one or more pairs of wires, for example input and output wires 118 and 120 described above and illustrated in FIG. 1. In one embodiment, one node from each 16-node network is connected to one node of at least one other 16-node network. For example, in FIG. 3*a* one node from each 16-node network 340 is connected to one node from the other three 16-node networks 340 via network connection paths 345. In an embodiment, network 1 in FIG. 3*a* is a 16 node network, for example as illustrated in FIG. 2. A node in network 1, for example node 16, is connect to a node in networks 2, 3, and 4. In another embodiment, for example the network illustrated in FIG. 3*c*, one node from each 16-node network 340 is connected to one node from some but not all of the other 16-node networks. In the network illustrated in FIG. 3*c*, one node from each 16-node network is connected to a node in each of three other 16-node networks 340 via network connection paths 345.

In another embodiment, each node from each 16-node network is connected to a corresponding node in each other 16 node network. For example, in FIG. 3*a* each node from each 16-node network 340 is connected to a corresponding node in each of the other three 16-node networks 340 via network connection paths 345. Networks 1, 2, 3, and 4 in FIG. 3*a* are 16 node networks, for example as illustrated in FIG. 2. Each node in networks 1, 2, 3, and 4 is connected to a corresponding node in the other networks. For example node 1 in networks 1, 2, 3, and 4 are all be connected to each other. This may also be true for nodes 2-16 of networks 1, 2, 3, and 4.

FIG. 3*a* shows an embodiment where four 16-node networks are connected. Depending on the network connection paths 345 used between each of the four 16-node networks, this setup guarantees that no two nodes are farther apart than either four or seven hops, depending on how the networks are connected to each other. For example, if network connection paths 345 connect only one node from each 16-node network to only one node in each of the other three 16-node networks, then it take at most 3 hops to get from any node to the connection node for the 16-node network labeled "1" in FIG. 3a, one hop to get to the connection node of any of the other 16-node networks, for example the 16-node network labeled "2", and up to 3 hops to get from the connection node in the 16-node network labeled "2" to any other node in the 16-node network labeled "2." Thus, each node is at most seven hops from any other node.

In another example, if each node in each 16-node network is connected to a corresponding node in each of the other three 16-node networks, then it would take at most four hops to navigate between any two of the 64 nodes illustrated in FIG. 3a. It would take one hop to get from the source node's 16-node network to the corresponding node in the destination node's 16-node network and then the destination node is no more than three hops from the corresponding node. Thus, each node is at most four hops from any other node.

FIG. 4 shows a flowchart depicting a method 400, according to an embodiment. For example, method 400 can be used to efficiently transmit requests between two nodes in a Network-on-Chip. In one example, method 400 is performed by nodes within the 16-node network communication system 200 to transmit requests between nodes 104 in the network. It is to be appreciated that method 400 may not be performed in the order shown, or require all of the operations shown. Merely for convenience, and without limitation, method 400 is described with reference to FIG. 2.

In step 402, the process starts when a source node receives a request that needs to be transmitted to another node in the Network-on-Chip, for example the 16-node network communication system 200.

In step 404, the source node determines the destination node for the request. The destination node may be a node within the 16-node network communication system 200 as shown in FIG. 2, or a node within another 16-node network in communication with this 16-node network communication system 200.

In step 406, the node identifies a next node on a shortest path from the source node to the destination node. The node may use an allocation mapping stored in the router or dedicated memory, as discussed above. If the source and destination node are within the same 16-node network, the shortest path will include at most three hops. If the source node and the destination node are both within separate 16-node networks where only one node in each network is connected to other networks, then the shortest path will include at most three hops in each of the nodes respective 16-node networks in addition to the number of hops to get from the source node's 16-node network to the destination node's 16-node network. If the source node and the destination node are both within 16 node networks where each node in each network is connected to a corresponding node in the other network, then the shortest path will include one hop from the source node's 16-node network to the destination node's 16-node network and at most three additional hops.

In step 408, the source node transmits the request to the next node on the shortest path. The source node may also transmit additional information such as the path between the source node and the destination node or merely the destination node.

Embodiments can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

In this document, the terms "computer programmable medium" and "computer-usable medium" are used to generally refer to media such as a removable storage unit or a hard disk drive. Computer program medium and computer-usable medium can also refer to memories, such as system memory and graphics memory which can be memory semiconductors (e.g., DRAMs, etc.). These computer program products are means for providing software to an APD.

The embodiments are also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments described herein. Embodiments employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary contemplated embodiments, and thus are not intended to limit the embodiments and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the relevant art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system comprising:
   a microprocessing chip comprising sixteen processing nodes disposed on the chip, a second microprocessing chip comprising sixteen second processing nodes disposed on the chip, a third microprocessing chip comprising sixteen third processing nodes disposed on the chip, and a fourth microprocessing chip comprising sixteen fourth processing nodes disposed on the chip; and
   a plurality of connection paths connecting the nodes, wherein the connection paths are configured such that each node is at most three hops away from any other node, and wherein each node has a connection path to at most three other nodes;
   wherein the sixteen processing nodes form a first 16 node network, the sixteen second processing nodes form a second 16 node network, the sixteen third processing nodes form a third 16 node network, and the sixteen fourth processing nodes form a fourth 16 node network;
   a second plurality of second connection paths connecting the second processing nodes, wherein the second connection paths are configured such that each second processing node is at most three hops away from any of the remaining second processing nodes, and wherein each second processing node has a connection path to at most three other second processing nodes;
   a third plurality of third connection paths connecting the third processing nodes, wherein the third connection paths are configured such that each third processing node is at most three hops away from any of the remaining third processing nodes, and wherein each third processing node has a connection path to at most three other third processing nodes;
   a fourth plurality of fourth connection paths connecting the fourth processing nodes, wherein the fourth connection paths are configured such that each fourth processing node is at most three hops away from any of the remaining fourth processing nodes, and wherein each fourth processing node has a connection path to at most three other fourth processing nodes; and
   a network connection path connecting the four 16 node networks, wherein the network connection path connects each node from each 16 node network to a corresponding node in each of the other three 16 node networks such that each node in the system is at most four hops from any other node in the system.

2. The system of claim 1, wherein each processing node comprises:
   a processing unit;
   a dedicated memory; and
   a 3×3 crossbar switch.

3. The system of claim 2, wherein the processing unit is a central processing unit or graphics processing unit.

4. The system of claim 2, wherein the 3×3 crossbar switch is configured to route requests to a connected node.

5. The system of claim 4, wherein the 3×3 crossbar switch comprises a router configured to determine a shortest path to the destination node, and the 3×3 crossbar switch is configured to use the shortest path.

6. The system of claim 1, wherein each node has a connection path to exactly three other nodes.

7. The system of claim 1, wherein each of the plurality of connection paths connects two nodes.

8. The system of claim 7, wherein each of the plurality of connection paths comprise two wires, a first wire that is an input to a first node and output for a second node and a second wire that is an output for the first node and an input to the second node.

9. The system of claim 1, wherein the network path connection comprises a network path that includes two wires, a first wire that is an input to a first node and output for a second node and a second wire that is an output for the first node and an input of the second node.

10. The system of claim 9, wherein the network paths define a one-to-one mapping of nodes from one 16 node network and a different 16 node network.

11. A method comprising:
    determining a destination node for a request;
    identifying a next node on a shortest path from a source node to the destination node; and
    transmitting the request to the next node on the shortest path;
    wherein:
    the source node is in a first 16 node network;
    each node within the first 16 node network is within three hops of every other node in the first 16 node network; and
    each node within the first 16 node network has a connection path to at most three other nodes within the first 16 node network,
    wherein determining the destination node for the request comprises determining that the destination node is a node within a second 16 node network, each node within the second 16 node network is within three hops of every other node in the second 16 node network; and each node within the second 16 node network has a connection path to at most three other nodes within the second 16 node network, wherein the second 16 node network is any one of three different 16 node networks;
    wherein a network connection path connects the four 16 node networks and the network connection path connects each node from each 16 node network to a corresponding node in each of the other three 16 node networks such that each node is at most four hops from any other node.

12. The method of claim 11, further comprising:
    receiving, by the source node, the request to be transmitted to the destination node.

13. The method of claim 11, wherein determining the destination node for the request comprises determining that the destination node is a node within the network.

14. The method of claim 11, wherein determining the destination node for the request comprises determining that the source node in the network is connected to a corresponding node in the second network and the identifying the next node on the shortest path also identifies a path that is four or fewer hops long.

15. The method of claim 11, wherein determining the destination node for the request comprises determining that a node from the network has a connection path to a node in the second network and the identifying the next node on the shortest path also identifies a path that requires at most three hops in each of the network and the second network in addition to any hops to transmit the request between the network and the second networks.

16. The method of claim 11, wherein the request comprises the destination node and determining the destination node comprises retrieving the destination node from the request.

* * * * *